United States Patent
Choi et al.

(10) Patent No.: US 9,172,592 B2
(45) Date of Patent: Oct. 27, 2015

(54) APPARATUS AND METHOD FOR PROVIDING APPLICATION-RELATED MANAGEMENT OBJECT

(75) Inventors: Seok-Hoon Choi, Seoul (KR); Ji-Hye Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 317 days.

(21) Appl. No.: 13/809,378

(22) PCT Filed: May 19, 2011

(86) PCT No.: PCT/KR2011/003714
§ 371 (c)(1),
(2), (4) Date: Jan. 9, 2013

(87) PCT Pub. No.: WO2012/005442
PCT Pub. Date: Jan. 12, 2012

(65) Prior Publication Data
US 2013/0117433 A1 May 9, 2013

(30) Foreign Application Priority Data
Jul. 9, 2010 (KR) ........................ 10-2010-0066567

(51) Int. Cl.
*G06F 15/173* (2006.01)
*H04L 12/24* (2006.01)
*G06F 9/445* (2006.01)

(52) U.S. Cl.
CPC ................ *H04L 41/00* (2013.01); *G06F 8/665* (2013.01)

(58) Field of Classification Search
CPC ................................ G06F 8/665; H04L 41/00
USPC .......................................................... 709/223
See application file for complete search history.

(56) References Cited

U.S. PATENT DOCUMENTS

| | | | |
|---|---|---|---|
| 8,595,186 B1 * | 11/2013 | Mandyam et al. | 707/632 |
| 2009/0228984 A1 * | 9/2009 | Sterin | 726/26 |
| 2009/0313630 A1 * | 12/2009 | Hori | 718/102 |
| 2010/0169413 A1 * | 7/2010 | Kim et al. | 709/203 |
| 2011/0130118 A1 * | 6/2011 | Fan et al. | 455/411 |
| 2012/0209923 A1 * | 8/2012 | Mathur et al. | 709/206 |
| 2012/0317638 A1 * | 12/2012 | Carrara et al. | 726/17 |
| 2013/0046585 A1 * | 2/2013 | Bang et al. | 705/7.38 |

FOREIGN PATENT DOCUMENTS

| | | |
|---|---|---|
| KR | 1020090004373 | 1/2009 |
| KR | 1020090020966 | 2/2009 |
| KR | 1020090048000 | 5/2009 |
| KR | 1020090123474 | 12/2009 |

OTHER PUBLICATIONS

PCT/ISA/237 Written Opinion issued on PCT/KR2011/003714 (pp. 3).
PCT/ISA/210 Search Report issued on PCT/KR2011/003714 (pp. 3).

* cited by examiner

*Primary Examiner* — Mohamed Wasel
(74) *Attorney, Agent, or Firm* — The Farrell Law Firm, P.C.

(57) ABSTRACT

A method and an apparatus for providing an application-related management object is provided. The method includes receiving a registration message for registering information on an installed application, determining a requirement of the installed application contained in the registration message, acquiring application-related management object information corresponding to the requirement, identifying a method of providing the application-related management object information, and providing the application-related management object information according to the identified method.

20 Claims, 8 Drawing Sheets

APPARATUS AND METHOD FOR PROVIDING APPLICATION-RELATED MANAGEMENT OBJECT

PRIORITY

This application is a National Phase Entry of PCT International Application No. PCT/KR2011/003714, which was filed on May 19, 2011, and claims priority to Korean Patent Application Serial No. 10-2010-0066567, which was filed in the Korean Intellectual Property Office on Jul. 9, 2010, the entire content of each of which is incorporated herein by reference.

BACKGROUND OF THE INVENTION

1. Field of the Invention

The present invention generally relates to an apparatus and a method for Device Management (DM), and more particularly, to an apparatus and a method for providing an application-related management object through an Open Application Program Interface (API) corresponding to an open programming interface provided by a DM client.

2. Description of the Related Art

A conventional device management method operates in a peer-to-peer scheme. That is, between a DM server on a network and a DM client included in a wireless communication terminal, a peer-to-peer session is generated and a message defined in a DM protocol is exchanged, so that the DM server allows the DM client to perform a particular operation such as adding/deleting/changing a particular configuration in the terminal.

The Device Management (DM) protocol is defined as a total of five messages including package #0 to package #4, and a DM session may be formed between the DM server and the terminal through the DM protocol. The DM session may be initiated by the DM server or the client, that is, the terminal.

FIG. 1 is a diagram illustrating a general DM session setup process.

Referring to FIG. 1, when a particular terminal has a management operation to be performed, a DM server 20 transmits a package #0 notification message to the particular terminal, that is, a DM client 10 included in the particular terminal to inform the DM client 10 that there is a DM action in step 101. When the package #0 notification message is received, the DM client 10 makes a request for a session configuration by transmitting a package #1 message to the DM server 20 in step 103. The DM server 20 accepts a DM session setup and transmits a package #2 message for delivering a DM command for a waiting terminal management operation to the DM client 10 in step 105, and the DM client 10 transmits a package #3 message to the DM server 20 in order to deliver a performance result of the DM command received from the DM server 20 in response to the package #2 message in step 107.

Subsequently, the DM server 20 ends the DM session through a package #4 message in step 109 or transmits an additional management operation to the DM client 10, and the DM client 10 performs the additional management operation included in the package #4 message and reports a result thereof to the DM server 20 through the package #3 message. Thereafter, the DM server 20 and the DM client 10 may provide the management operation or management commands through iteration of the package #4 message and the package #3 message. In this case, when the management operation is continuously included in the package #4 message, the DM session is maintained. When there is no additional management operation, the DM session is terminated.

Meanwhile, for terminal management, terminal management targets are defined as Management Objects (MOs). Terminal management is achieved by the DM client 10 and the DM server 20 transmitting the management objects using the DM protocol.

As described above, MOs are defined according to a service desired to be provided using the DM protocol. However, currently there is no method in which an application changes or generates an application-related MO within a terminal supporting a terminal management service. Accordingly, the terminal manages the application by using an MO that has been changed or generated by the DM client 10 and the DM server 20 regardless of an application attribute. Accordingly, an application processor only receives a determined MO parameter value in a passive position of only receiving unilaterally the MO parameter value. Accordingly, when the MO parameter value considering the application attribute is provided, a function and a service which the application desires to provide may be optimized. Therefore, a need exists for a method of providing the MO parameter value considering the application attribute.

SUMMARY OF THE INVENTION

Accordingly, the present invention has been designed to address the above and other problems occurring in the prior art, and provide at least the advantages described below.

Accordingly, an aspect of the present invention provides an apparatus and a method for providing an application-related MO for optimizing a function and a service which the application desires to provide.

Also, an aspect of the present invention provides an apparatus and a method for providing an application-related MO according to a predetermined reception method by making a request for changing or generating the application-related MO.

In accordance with an aspect of the present invention, a method of providing an application-related management object in a terminal is provided. The method includes receiving a registration message for registering information on an installed application; determining a requirement of the application contained in the registration message; acquiring application-related management object information corresponding to the requirement; identifying a method of providing the application-related management object information; and providing the application-related management object information according to the identified method.

In accordance with another aspect of the present invention, an apparatus for providing an application-related management object is provided. The apparatus includes an application processor for transmitting a registration message for registering information on an installed application; and a terminal management client for determining a requirement of the application contained in the registration message, acquiring application-related management object information corresponding to the requirement, identifying a method of providing the application-related management object information, and providing the application-related management object information to the application processor according to the identified method.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
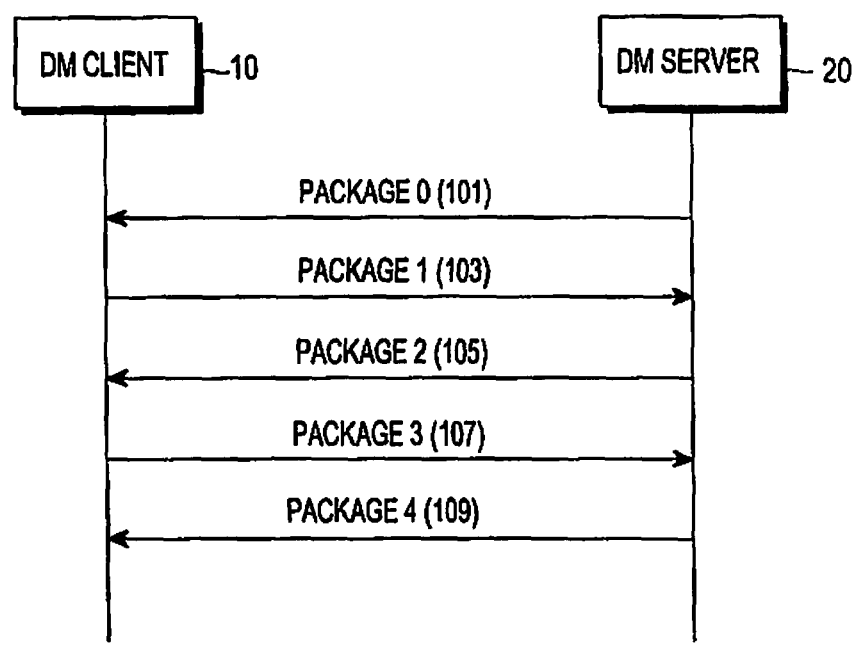
FIG. 1 is a diagram illustrating a general DM session setup process.

Hereinafter, embodiments of the present invention will be described with reference to the accompanying drawings. It should be noted that the same elements will be designated by the same reference numerals throughout the description. Further, a detailed description of known functions and configurations incorporated herein will be omitted when it may make the subject matter of the present invention rather unclear.

The present invention provides a method of providing an application-related MO parameter value. To this end, the method of the present invention includes receiving, for example, software, firmware or the like-related data in order to, when an application processor makes a request for an application-related MO parameter value or makes a request for changing the application-related MO parameter value, allow a DM client having received the request to directly generate the MO in response to the request or allow a DM server or a management authority to generate the MO corresponding to the request of the application processor, and transmitting the MO parameter value corresponding to the request to the application processor according to a reception method determined by the application processor. As described above, it is possible to optimize a function or a service, which can be provided in real time, by directly making a request for and receiving the application-related MO parameter value.

Prior to descriptions of the present invention, a Management Object (MO) used in the present invention will be briefly described below.

First, a DM tree represents a structure of the management object (MO) within a wireless communication terminal in a tree type, and the MO is a means for revealing a parameter and an object within the terminal to the DM server.

The MO structure may be defined by anyone such as a service provider, a terminal vendor or the like, and the MO has a particular MO ID to identify its own structure. Further, all of the MO structures corresponding to the MO ID are registered in and managed by a particular server, for example, Open Mobile Naming Authority (OMNA), and accordingly, the defined MO structure may be represented by the MO ID registered in the OMNA. That is, the MO corresponding to one MO ID has the same configuration and structure regardless of the type of wireless communication terminal. The MO corresponds to an interface of a data model accessible by the DM server and the DM client.

Hereinafter, a configuration of the DM system according to an embodiment of the present invention will be described with reference to FIG. 2.

A DM system for providing an application-related MO according to an embodiment of the present invention includes a management authority 200, a DM server 210, and a terminal 220. The terminal includes a DM client 230 and an application processor 240.

First, the management authority 200 refers to an entity having authority to manage the wireless communication terminal of the user such as a service provider, a network service provider, an enterprise or the like.

The DM server 210 serves to remotely manage the terminal 220 by using the DM protocol, and is subordinate to the management authority 200. A DM session may be configured between the DM server 210 and the terminal 220 through the DM protocol. When there is an MO update request from the terminal 220, the DM server 210 may provide software, firmware or the like-related data required for providing an MO parameter value requested by the application processor 240 to the DM client 230. The related data is used for generating the MO by the DM client 230. Further, the DM server 210 may make a request for the required software or firmware by the management authority 200.

Figure 2:
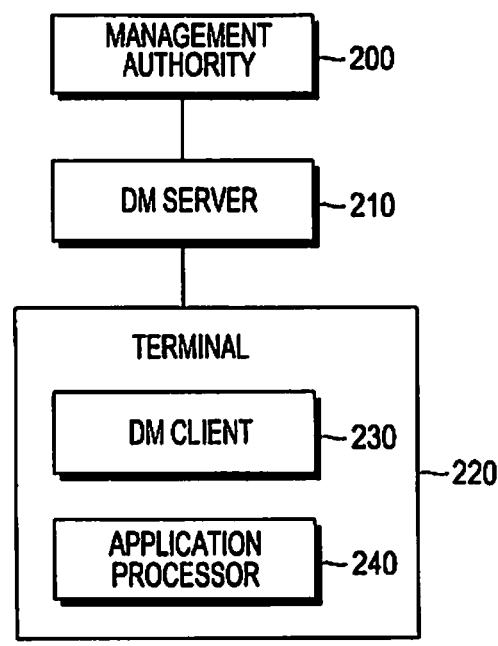
FIG. 2 is a block diagram illustrating a DM system showing a relation among a management authority, a DM server, and a terminal including a DM client according to an embodiment of the present invention.

In addition, although the DM server 210 and the management authority 200 are illustrated as separate entities in FIG. 2, the DM server 210 and the management authority 200 may be formed as one entity.

The terminal 220 is a wireless communication terminal, which includes the DM client 230 and an application processor 240. Further, although it is illustrated that the application processor 240 is separate from the DM client 230 in FIG. 2, the application processor 240 may be included as part of the DM client 230 or may be an internal function of the DM client 230. First, an application is downloaded to the terminal 220, and then installed by the application processor 240. When execution of the application starts after installation, the application processor 240 sets a service configuration with reference to the application-related MO or application-related requirement information and then performs an application function or service. In order to receive the application-related MO or the application-related requirement information, the application processor 240 must report information on the application to the DM client 230. Accordingly, the application processor 240 transmits an application registration message to the DM client 230 as the application is installed.

The application registration message is a message serving to make a request for the application-related MO. The application registration message contains at least one of an application ID, an application requirement, and a method of receiving a parameter value corresponding to a mandatory MO and an optional MO. The application requirement may be contained in a form corresponding to an MO tree or a form defined by the application itself, and includes mandatory information and optional information. That is, the application requirement includes both necessary conditions and optional conditions for executing the application. A method of receiving a mandatory MO parameter value and an optional MO parameter value refers to a method in which the application processor 240 receives the application-related MO parameter value from the DM client 230.

Further, the method of receiving the mandatory MO parameter value and the optional MO parameter value includes the following.

First, when both parameter values corresponding to a mandatory MO and an optional MO exist for the application requirement, there is a method of receiving both values from the DM client 230 at one time. Second, when the parameter value corresponding to the mandatory MO does not exist, there is a method of collecting all parameter values corresponding to the mandatory MO from the DM client 230 and then receiving all of the collected parameter values corresponding to the mandatory MO from the DM client 230. Third, when the parameter value corresponding to the optional MO does not exist, there is a method of collecting all parameter values corresponding to the optional MO from the DM client 230 and then receiving the collected parameter values corresponding to the optional MO together with all the parameter values corresponding to the mandatory MO from the DM client 230 at one time. Fourth, when the parameter value corresponding to the optional MO does not exist, there is a method of collecting all parameter values corresponding to the optional MO from the DM client 230, first receiving only the parameter values corresponding to the mandatory MO collected from the DM client 230, collecting all parameter values corresponding to the optional MO from the DM client 230, and then receiving only the collected parameter values corresponding to the optional MO in one message from or receiving the parameter values corresponding to the optional MO obtained from the DM client 230 whenever the parameter values corresponding to the optional MO from the DM client 230 are obtained.

When the parameter values corresponding to the application-related MO is received through the above methods, the application processor 240 performs the function or service provided by the corresponding application with reference to the parameter value corresponding to the received application-related MO.

The DM client 230 serves to provide the registration message from the application processor 240, that is, the parameter value corresponding to the MO in response to the application-related MO request. Accordingly, the DM client 230 examines whether the corresponding application is registered, and identifies the application requirement when the application is successfully registered. Specifically, the DM client 230 determines whether there is the MO parameter value corresponding to the application-related MO request. Specifically, the DM client 230 determines whether there are only some of the MO parameter values and whether the MO parameter values are variable, and generates the MO corresponding to the requirement of the application processor 240 and transmits information on the requirement to the application processor 240 and the DM server 210, as necessary. In other words, the DM client 230 changes the parameter value corresponding to the MO tree or generates a new MO tree based on the application requirements as necessary.

At this time, the change in the parameter value corresponding to the MO or the generation of the new MO tree may be directly performed by the DM client 230, or may be performed by the DM client 230 after the DM client 230 receives software, firmware or the like for generating the MO from the DM server 210 or the management authority 200.

Hereinafter, a process of providing the application-related MO parameter value to the application processor 240 when the application processor 240 generates the MO tree according to an embodiment of the present invention will be described with reference to the flowchart of FIG. 3.

Figure 3:
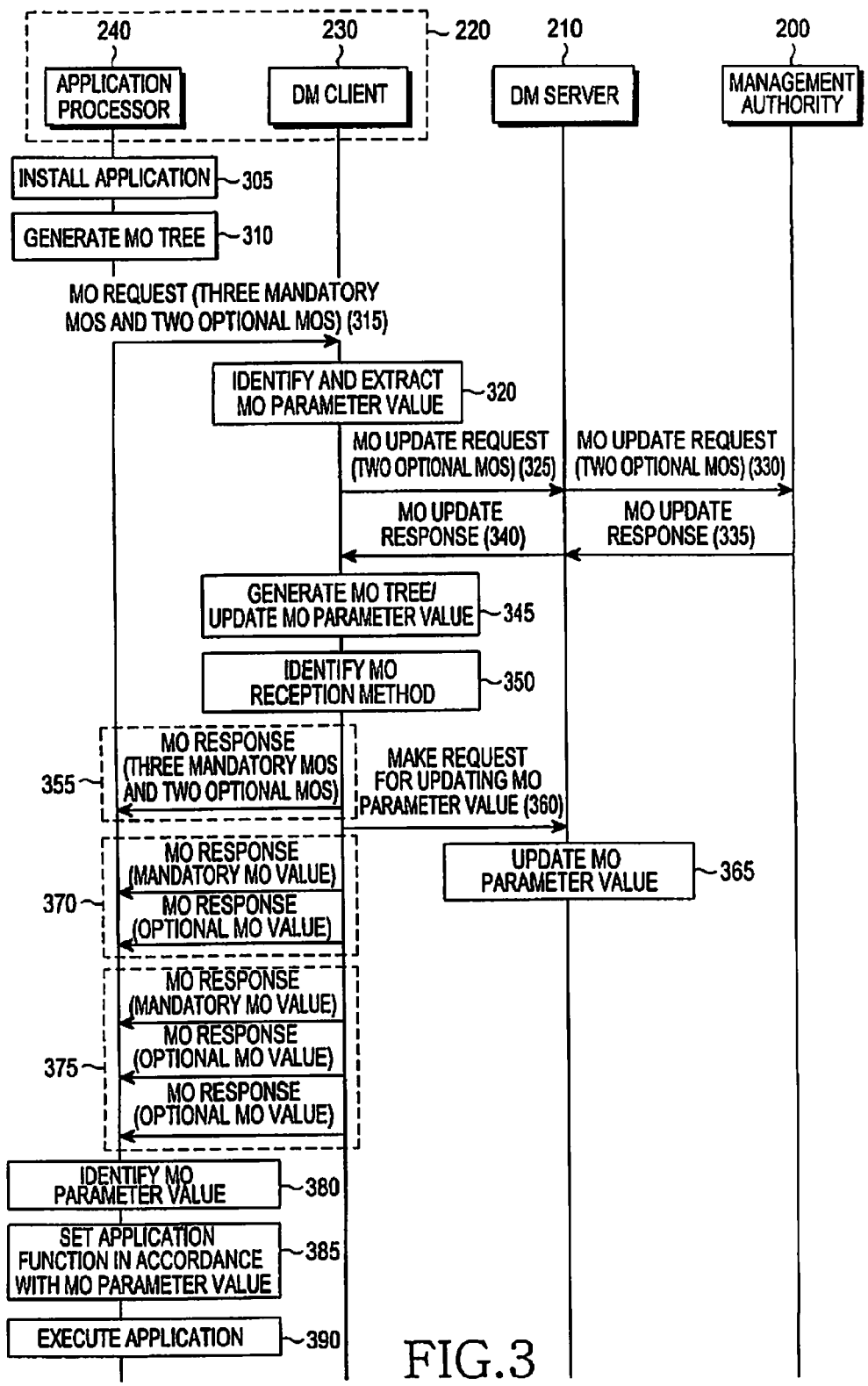
FIG. 3 is a flowchart illustrating a process of providing a related MO parameter when an application processor generates an MO tree according to an embodiment of the present invention.

Referring to FIG. 3, the application processor 240 installs the downloaded application in step 305, and then generates the MO tree for the application in step 310. Here, the MO tree generated by the application processor 240 will have the form shown in FIGS. 5 and 7, descriptions of which will be made below.

The application processor 240 transmits an MO request message to the DM client 230 to register application information in step 315. When it is assumed that the number of mandatory MO parameter values required for executing the application is three and the number of optional MO parameter values is two, the MO request message contains the MO parameter values to be requested as the application requirement item.

Figure 6:
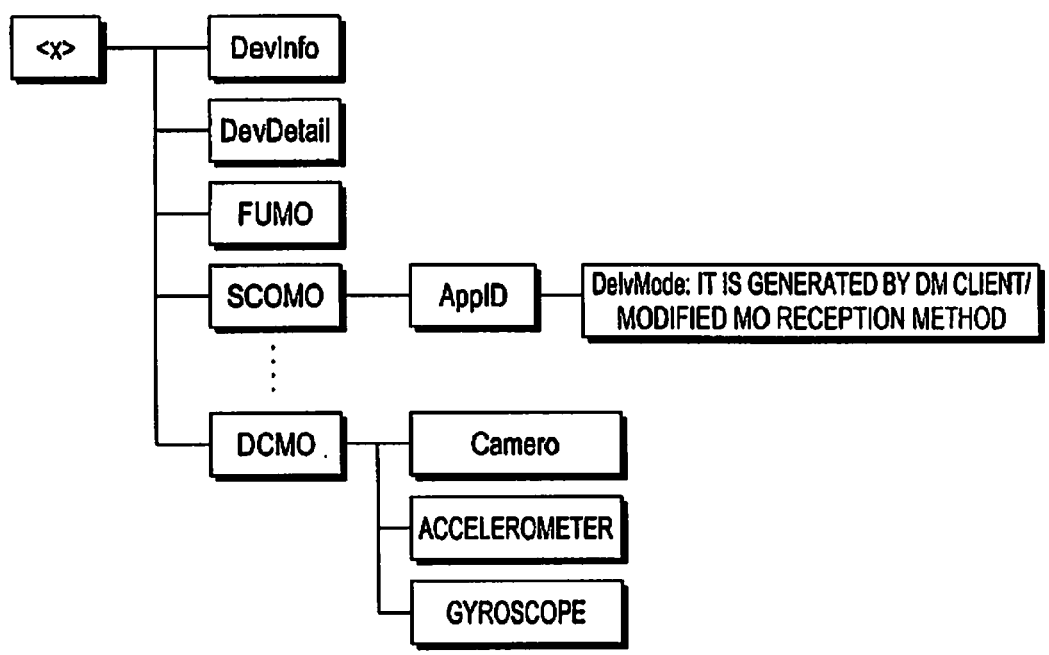
FIG. 6 is a block diagram illustrating an example of an MO tree generated by a DM client according to an embodiment of the present invention.
Figure 8:
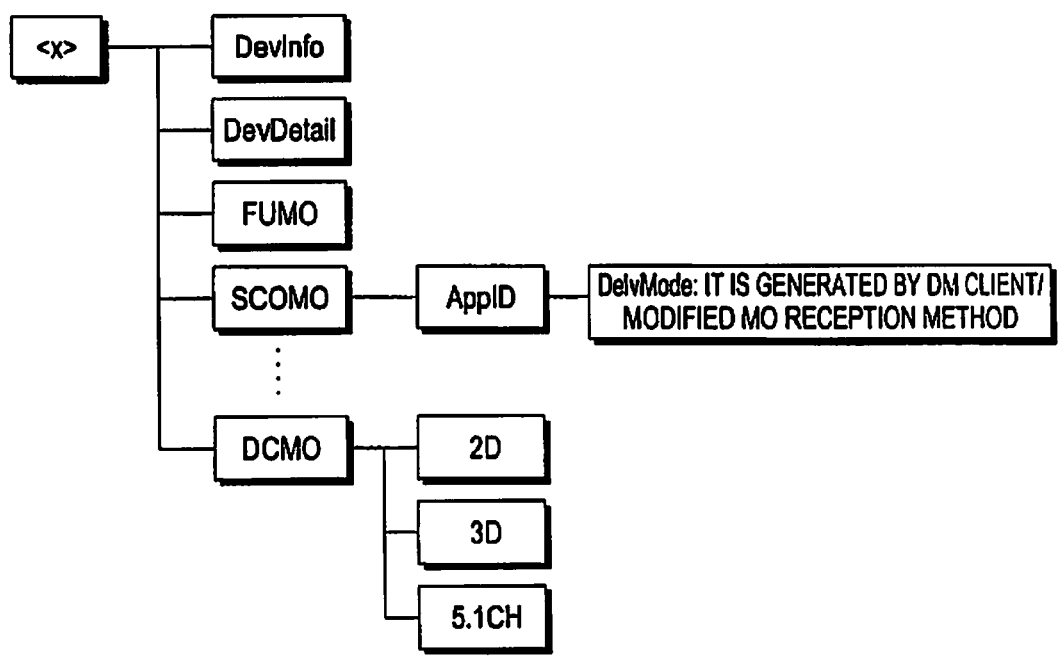
FIG. 8 is a block diagram illustrating another example of the MO tree generated by the DM client according to an embodiment of the present invention.

In addition to the application requirement, an application ID, an MO reception method and the like are contained in the MO request message. As described above, the application processor 240 sets the MO parameter value to be requested as the application requirement item with reference to the generated MO tree. When the DM client 230 receives the MO request message in step 315, the DM client 230 identifies the application requirement contained in the MO request message. When identifying the application requirement, the DM client 230 determines what the requested MO parameter value is. Accordingly, the DM client 230 identifies a corresponding item of the MO tree requiring the MO parameter value to identify the requested MO parameter value and then extracts the MO parameter value as the identified corresponding item of the MO tree in step 320. Here, the MO tree in the DM client 230 is as shown in FIGS. 6 and 8, a description of which will be made below.

The DM client 230 has the MO tree in advance, but the MO tree may be newly generated after the reception of the MO request message or may be newly generated as related data required for generating the MO is received from the DM server 210 or the management authority 200 according to the request of the application processor 240.

As described above, the DM client 230 extracts the corresponding MO parameter value within the MO tree in order to provide the requested MO parameter value to the application processor 240. At this time, the DM client 230 stores information such as the MO reception method contained in the MO request message in order to use it later to transmit an MO response message containing the requested MO parameter value to the application processor 240. When the DM client 230 does not have information corresponding to the application requirements, that is, all the MO parameter values, the DM client 230 may make a request for the information required for generating the MO by the DM server 210 or the management authority 200. Accordingly, the DM client 230 determines that an MO update request should be made as necessary. Here, when the DM client 230 has all the MO parameter values corresponding to the application requirement item, that is, when the MO parameter values extracted in step 320 satisfy the application requirements, the MO update request in step 325 or generating the updated MO parameter value in step 345 may be omitted.

On the other hand, FIG. 3 illustrates a case where the DM client 230 receives information required for generating the MO, wherein the DM client 230 has the mandatory MO parameter value corresponding to the application requirement item but does not have the optional MO parameter value. Since steps 325 and 340 follow a method defined in conventional OMA Firmware Update Management Object (FUMO) and Software Component Management Object (SCOMO)

technologies, a detailed description thereof will be omitted herein. The DM client 230 transmits the MO update request message to the management authority 200 through the DM server 210 in steps 325 and 330. The MO update request message contains information making a request for new software or firmware for generating two optional MO parameter values.

The management authority 200 transmits the software or the firmware for generating the optional MO parameter values to the DM client 230 through the DM server 210 based on the requested information contained in the MO update request message in steps 335 and 340. The DM client 230 generates a new MO tree or updates the corresponding MO parameter value of the MO tree by installing the received software or firmware in step 345.

Subsequently, the DM client 230 identifies the MO reception method in step 350. To this end, the DM client 230 refers to an MO reception method item among items included in the MO request message. When there are both the mandatory MO information and the optional MO information corresponding to the application requirement as the MO reception method, and the method of receiving both the mandatory MO information and the optional MO information from the DM client 230 at one time is set, the DM client 230 transmits information on three mandatory MOs and two optional MOs, that is, an MO response message containing the MO parameter values requested by the application processor 240 to the application processor 240, in step 355.

Further, the DM client 230 makes a request for updating the MO parameter values by the DM server 210 in step 360. Then, the DM server 210 having received the corresponding request message updates the MO parameter values according to the received information in step 365.

The application processor 240 identifies the MO parameter values contained in the MO response message received from the DM client 230 in step 380. Subsequently, the application processor 240 sets an application function or a service configuration in accordance with the information contained in the received MO response message, that is, the MO parameter values in step 385, and then performs the function or service for providing the application by executing the application in step 390.

Meanwhile, step 355 describes the case where information corresponding to all mandatory MOs and optional MOs is received at one time as the method of receiving application-related MO parameter values, but the process may be replaced according to the following MO reception method.

First, as indicated by a reference number 370, a method of first receiving only the mandatory MO parameter values collected from the DM client 230 and then receiving a message including only the separately collected optional MO parameter values is described. In this case, the DM client 230 transmits the MO response message containing the mandatory MO information and then transmits the MO response message containing the collected optional MO information.

Alternatively, as indicated by a reference number 375, a method of first receiving only the mandatory MO parameter values collected from the DM client 230 and then receiving the optional MO parameter values whenever the DM client 230 acquires the optional MO parameter values one by one is described. In this case, in order to transmit information on the two optional MOs, it is preferable that MO update responses are transmitted two times, each of the MO update responses containing information on one optional MO at one time. Accordingly, the DM client 230 transmits the MO response message containing the mandatory MO information, and then transmits the MO response messages containing the optional MO information one by one. Accordingly, the application processor 240 sets the service configuration according to the information contained in the MO response message in step 385, and then performs the function or service provided by the application in step 390.

Hereinafter, according to another embodiment of the present invention, a process in which the DM client 230 provides the application-related MO parameter values to the application processor 240 when the application processor 240 does not generate the MO tree will be described with reference to FIG. 4.

Figure 4:
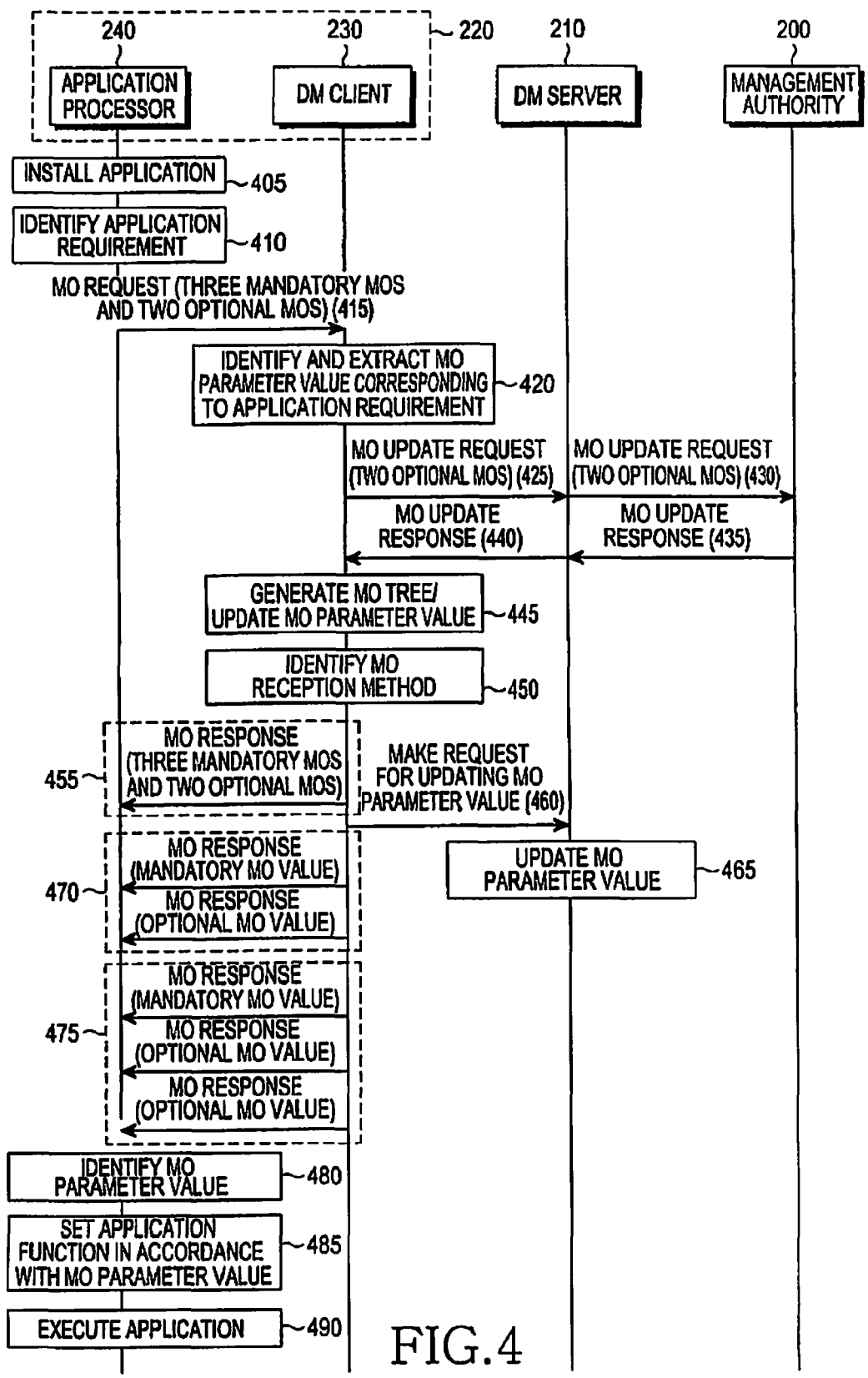
FIG. 4 is a flowchart illustrating a process of providing a related-application requirement when an application processor does not generate an MO tree according to another embodiment of the present invention.

Referring to FIG. 4, the application processor 240 installs the downloaded application in step 405, and then identifies the application requirement in step 410. In other words, the application processor 240 identifies information required for executing the application and generates the application requirement including mandatory information and optional information. The application requirement is inserted into an MO request message and then transmitted to the DM client 230 in step 415. Here, the MO request message has the same form as that of the MO request message in step 315 of FIG. 3. However, the application requirement may be included in a form corresponding to the MO tree or a form defined by the application itself.

The application processor 240 transmits the MO request message to the DM client 230 in order to register application information in step 415. When the DM client 230 receives the MO request message in step 415, the DM client 230 identifies an MO parameter value corresponding to the application requirement within the MO request message and extracts the identified MO parameter value in step 420.

Hereinafter, since steps 425 to 490 of FIG. 4 are the same as steps 325 to 390 of FIG. 3, detailed descriptions thereof will be omitted. However, FIG. 4 illustrates a case where the DM client 230 generates an MO tree corresponding to the application requirement or updates the MO parameter value instead of the application processor 240. Accordingly, the DM client 230 transmits to the DM server 210 an MO response message containing the MO parameter value corresponding to the application requirement to the application processor 240 according to the identified MO reception method in step 460.

Figure 5:
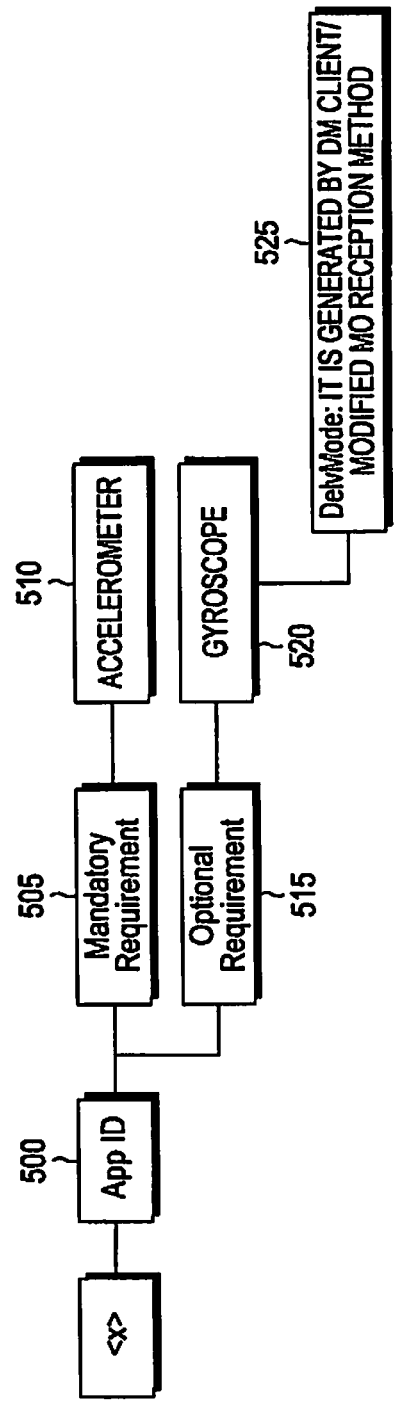
FIG. 5 is a block diagram illustrating an example of an MO tree generated by an application processor according to an embodiment of the present invention.
Figure 7:
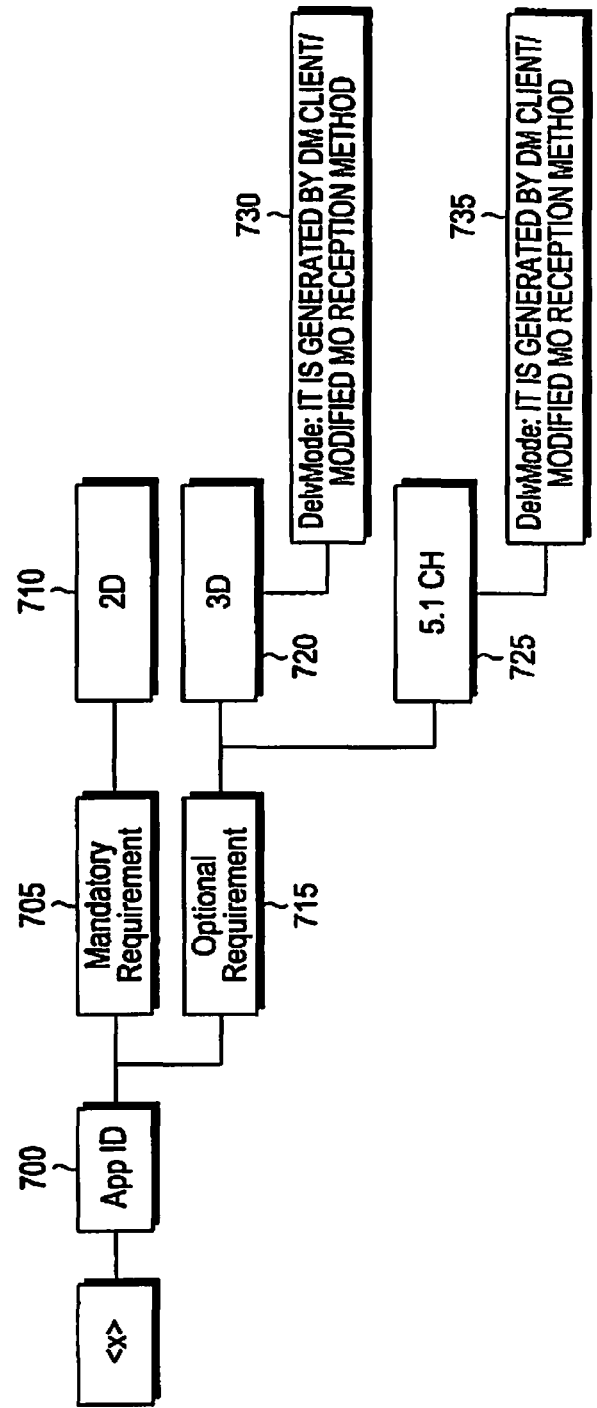
FIG. 7 is a block diagram illustrating another example of the MO tree generated by the application processor according to an embodiment of the present invention.

Meanwhile, FIGS. 5 and 7 illustrate MO trees generated by the application processor 240 according to embodiments of the present invention, respectively, and FIGS. 6 and 8 illustrate MO trees generated by the DM client 230.

First, FIG. 5 illustrates the MO tree when the application is a Jenga® (hereinafter "Jenga") game application. In order to provide a Jenga game service, an accelerometer function is necessarily required, i.e., is a mandatory requirement, and a gyroscope function may be optionally employed, i.e. is an optional requirement, to provide an additional user experience thereto.

The Jenga game application may provide a game server only with an accelerometer, and horizontal and vertical sensing functions, and may provide a more optimized game service if the terminal supports the gyroscope function supporting a detailed function which the user desires. Here, a gyroscope sensor for the gyroscope function has characteristics of detecting a stereoscopically generated human motion beyond a conventional function of detecting only acceleration and horizontal and vertical directions by a sensor. Thus, the gyroscope sensor is provided for detecting a three-dimensional motion, and is easily used for a three-dimensional game.

When the Jenga game application is installed, the application processor 240 generates the MO tree as illustrated in FIG.

5, wherein the MO request message contains accelerometer information as the parameter value corresponding to the mandatory MO and gyroscope information as the parameter value corresponding to the optional MO, which are Jenga game application requirement items.

Referring to FIG. 5, an application ID 500 is set as a Jenga game application ID, a mandatory requirement 505 contains accelerometer information 510, an optional requirement 515 contains gyroscope information 520, and "DelvMode" 525 indicating the application-related MO reception method is included in a lower node. At this time, the accelerometer information 510 and the gyroscope information 520 contain information on "off/on" or "supported/unsupported".

Meanwhile, the DM client 230 has the MO tree as illustrated in FIG. 6. The DM client 230 identifies whether information corresponding to the mandatory requirement and the optional requirement is information supportable by the terminal by extracting the corresponding MO parameter value from the MO tree in response to the MO request message from the application processor 240.

When the DM client 230 already has all MO parameter values, the DM client 230 provides the extracted MO parameter value to the application processor 240 according to the MO reception method. On the other hand, when the DM client 230 does not have all MO parameter values, the DM client 230 acquires the corresponding MO parameter value through the MO update request, and installs software or firmware corresponding to the acquired MO parameter value. The DM client 230 then generates a new MO tree including the acquired MO parameter value and updates the MO parameter value to be transmitted to the application processor 240. For example, when the DM client 230 acquires a 3D accelerator as software corresponding to the acquired MO parameter value, the DM client 230 generates a new MO, that is, the MO tree and the parameter value as the 3D accelerator is installed.

As described above, as the new MO tree and the MO parameter value are updated, accelerometer information and gyroscope information nodes of FIG. 6 are filled with the acquired MO parameter values, respectively.

The application processor 240 performs the Jenga game service upon receiving the MO information, for example, the requested MO parameter value. Accordingly, the application processor 240 performs an operation in a mode which supports or does not support the gyroscope. When the DM client 230 does not provide all mandatory MO parameter values to the application processor 240, the application processor 240 shows an error message indicating that the Jenga game service cannot be provided to the user. For example, a sentence such as "This is an application which is not supported by your terminal." is displayed on a screen. On the other hand, when the DM client 230 does not provide the optional MO parameter value to the application processor 240, the application processor 240 provides the Jenga game service in a mode supporting only the acceleration sensor. As illustrated in FIG. 5, according to the request of the application processor 240, a hardware change may be possible.

FIG. 7 illustrates the MO tree when the application is a video reproduction application. For a video reproduction service, a 2D video reproduction function is necessarily required, and a 3D video reproduction function and a 5.1 CH sound function are optionally employed to provide an additional user experience thereto, so that two types (2D or 3D) of services may be provided.

The video reproduction application may provide a video service only with 2D functionality. When the user terminal provides a 3D accelerator and the 5.1 CH sound function, it is possible to provide a more optimized video service by supporting the corresponding function. Accordingly, the application processor 240 includes 2D information in the MO request message as the mandatory MO parameter value and includes 3D information and 5.1 CH information in the MO request message as the optional MO parameter value.

Meanwhile, the DM client 230 has the MO tree as illustrated in FIG. 8. However, the DM client 230 identifies the corresponding MO tree item by identifying whether the mandatory requirement and the optional requirement in the MO tree as illustrated in FIG. 8 are supportable by the terminal. Subsequently, the DM client 230 extracts the corresponding MO parameter value from the MO tree of FIG. 8 or transmits the acquired MO parameter value to the application processor 240 according to the MO update request. Here, a 2D information node and a 3D information node are filled with the acquired MO parameter value as the DM client 230 generates a new MO tree or updates the MO parameter values.

Referring back to FIG. 7, an application ID 700 is set as a video reproduction application ID, a mandatory requirement 705 contains 2D information 710, an optional requirement 715 contains 3D information 720 and 5.1 CH information 725, and "DelvMode" 730 and 735 indicating the application-related MO reception methods are included in a lower node. As illustrated in FIG. 7, the software and/or hardware change may be possible such that the 3D video function may be employed in software according to the request of the application processor 240, and the 5.1 CH sound function may be employed in hardware.

According to the present invention, an application processor within a DM terminal directly makes a request for and receives application-related MO parameter information, so that it is possible to optimize a function or a service, which can be provided in real time. Further, it is possible to receive an indication as to whether there is a new MO to be generated later or an available MO parameter value (creation/availability of a new MO) through a method selected by the application processor.

While the invention has been shown and described with reference to certain embodiments thereof, it will be understood by those skilled in the art that various changes in form and details may be made therein without departing from the spirit and scope of the invention as defined by the appended claims and their equivalents.

The invention claimed is:
1. A method of providing an application-related management object in a terminal, the method comprising:
receiving a registration message for registering information on an installed application, wherein the registration message comprises at least one of an application ID, an application requirement, and a method of receiving a parameter value corresponding to a management object;
determining a requirement of the installed application contained in the registration message;
acquiring application-related management object information corresponding to the requirement;
identifying a method of providing the application-related management object information; and
providing the application-related management object information according to the identified method.
2. The method of claim 1, wherein the requirement of the application contains mandatory management object information and optional management object information for executing the installed application.
3. The method of claim 2, wherein acquiring the application-related management object information comprises:

determining whether there is the mandatory management object information and the optional management object information;

making a request for an update by a terminal management server when there is not the mandatory management object information and/or the optional management object information; and acquiring the mandatory management object information and/or the optional management object information in response to the request for the update.

4. The method of claim 3, further comprising, when the mandatory management object information and/or the optional management object information are acquired, generating a new management object tree including the acquired mandatory management object information and/or optional management object information.

5. The method of claim 3, wherein determining whether there is the mandatory management object information and/or the optional management object information comprises identifying an item corresponding to a requirement of a management object tree.

6. The method of claim 2, wherein providing the application-related management object information comprises transmitting the mandatory management object information and the optional management object information at one time when there are both the mandatory management object information and the optional management object information corresponding to the requirement.

7. The method of claim 2, wherein providing the application-related management object information comprises collecting and then transmitting all mandatory management object information when there is not the mandatory management object corresponding to the requirement.

8. The method of claim 2, wherein providing the application-related management object information comprises:
   when there is the mandatory management object information and there is not the optional management object information corresponding to the requirement,
   transmitting all mandatory management object information;
   collecting all optional management object information; and
   transmitting the all optional management object information together with the mandatory management object information.

9. The method of claim 2, wherein providing the application-related management object information comprises:
   when there is the mandatory management object information and there is not the optional management object information corresponding to the requirement,
   transmitting all mandatory management object information;
   acquiring the optional management object information corresponding to the requirement; and
   transmitting the acquired optional management object information whenever the optional management object information is acquired.

10. The method of claim 2, further comprising, when all mandatory management object parameter values are not provided in response to receiving the registration message, displaying an error message indicating that service corresponding to the installed application cannot be provided.

11. An apparatus for providing an application-related management object, the apparatus comprising:
   an application processing unit for transmitting a registration message for registering information on an installed application, wherein the registration message comprises at least one of an application ID, an application requirement, and a method of receiving a parameter value corresponding to a management object; and
   a device management unit for determining a requirement of the installed application contained in the registration message, acquiring application-related management object information corresponding to the requirement, identifying a method of providing the application-related management object information, and providing the application-related management object information to the application processing unit according to the identified method.

12. The apparatus of claim 11, wherein the requirement of the application contains mandatory management object information and optional management object information for executing the application.

13. The apparatus of claim 12, wherein the device management client unit determines whether there is the mandatory management object information and the optional management object information, makes a request for an update by a terminal management server when there is not the mandatory management object information and/or the optional management object information, and then acquires the mandatory management object information and/or the optional management object information in response to the request for the update.

14. The apparatus of claim 13, wherein, when the mandatory management object information and/or the optional management object information are acquired, the device management client unit generates an application-related management object tree.

15. The apparatus of claim 11, wherein the application processing unit is included as part of the device management client unit.

16. The apparatus of claim 12, wherein, when there are both the mandatory management object information and the optional management object information corresponding to the requirement, the device management client unit transmits the mandatory management object information and the optional management object information at one time.

17. The apparatus of claim 12, wherein, when there is not the mandatory management object corresponding to the requirement, the device management client unit collects and then transmits all mandatory management object information.

18. The apparatus of claim 12, wherein, when there is the mandatory management object information and there is not the optional management object information corresponding to the requirement, the device management client unit transmits all mandatory management object information, collects all optional management object information, and transmits the all optional management object information together with the mandatory management object information.

19. The apparatus of claim 12, wherein, when there is the mandatory management object information and there is not the optional management object information corresponding to the requirement, the device management client unit transmits all mandatory management object information, and transmits the acquired optional management object information whenever the optional management object information is acquired.

20. The apparatus of claim 12, wherein when the device management client unit does not provide all mandatory management object parameter values to the application processing unit in response to receiving the registration message, the application processing unit displays an error message indicating that service corresponding to the installed application cannot be provided.

* * * * *